(12) United States Patent
Folkert et al.

(10) Patent No.: US 8,540,318 B2
(45) Date of Patent: Sep. 24, 2013

(54) VEHICLE SEATING FRAME ATTACHMENT ASSEMBLY, AND METHOD OF MAKING THE SAME

(75) Inventors: Mark Allyn Folkert, Farmington Hills, MI (US); William Barr, Troy, MI (US); Ashford A. Galbreath, Troy, MI (US); Asad S. Ali, Troy, MI (US)

(73) Assignee: Lear Corporation, Southfield, MI (US)

( * ) Notice: Subject to any disclaimer, the term of this patent is extended or adjusted under 35 U.S.C. 154(b) by 212 days.

(21) Appl. No.: 13/106,056

(22) Filed: May 12, 2011

(65) Prior Publication Data

US 2012/0187739 A1 Jul. 26, 2012

Related U.S. Application Data

(60) Provisional application No. 61/461,554, filed on Jan. 20, 2011.

(51) Int. Cl.
A47C 7/02 (2006.01)
A47C 7/18 (2006.01)
A47C 7/20 (2006.01)

(52) U.S. Cl.
USPC ............ 297/452.53; 297/452.14; 297/452.18; 297/452.52; 297/452.54; 297/452.55

(58) Field of Classification Search
USPC ............ 297/452.14, 452.18, 452.52, 452.53, 297/452.54, 452.55
See application file for complete search history.

(56) References Cited

U.S. PATENT DOCUMENTS

| | | | | |
|---|---|---|---|---|
| 2,833,339 A | * | 5/1958 | Liljengren | 297/452.18 X |
| 3,005,213 A | * | 10/1961 | Brown et al. | 297/452.52 |
| 3,035,828 A | * | 5/1962 | Stubnitz | 297/452.52 X |
| 3,874,731 A | * | 4/1975 | Jordan | 297/452.52 |
| 4,711,497 A | * | 12/1987 | Kazaoka et al. | 297/452.54 |
| 4,854,643 A | * | 8/1989 | Cojocari et al. | 297/452.52 |
| 4,873,036 A | | 10/1989 | Urai | |
| 4,969,687 A | * | 11/1990 | Higuchi et al. | 297/452.18 |
| 5,067,772 A | * | 11/1991 | Koa | 297/452.55 |
| 5,400,490 A | | 3/1995 | Burchi | |
| 5,462,339 A | * | 10/1995 | Schmale et al. | 297/452.55 |
| 5,522,645 A | * | 6/1996 | Dahlbacka | 297/452.55 |
| 5,542,747 A | * | 8/1996 | Burchi | 297/452.55 |
| 5,786,394 A | | 7/1998 | Slaven | |

(Continued)

FOREIGN PATENT DOCUMENTS

| | | |
|---|---|---|
| DE | 10119807 A1 | 10/2002 |
| WO | 9419209 A1 | 9/1994 |
| WO | 2006102969 A1 | 10/2006 |

*Primary Examiner* — Rodney B White
(74) *Attorney, Agent, or Firm* — Brooks Kushman P.C.

(57) ABSTRACT

In at least one embodiment, the present invention relates to a vehicle seat assembly comprising a seat frame made of structural foam and having a main body portion having a forward portion and a rearward portion, and a wire attachment bracket having a front attachment tab, a rear attachment tab, and a connecting portion extending between the front and rear attachment tabs. The front attachment tab can be securable to a vehicle floor pan to secure the forward portion of the seat frame to the vehicle floor pan, and the rear attachment tab can be securable to a vehicle floor pan to secure the rearward portion of the seat frame to the vehicle floor pan. In at least one embodiment, the vehicle seat assembly further comprises a cushion supported on the frame, with the cushion being softer than the seat frame, and a trim material disposed over the cushion.

20 Claims, 5 Drawing Sheets

(56) References Cited

U.S. PATENT DOCUMENTS

| | | | |
|---|---|---|---|
| 5,882,073 A | 3/1999 | Burchi et al. | |
| 6,082,824 A * | 7/2000 | Chow | 297/452.55 X |
| 6,406,093 B1 | 6/2002 | Miotto et al. | |
| 6,557,935 B2 | 5/2003 | Choi | |
| 6,663,178 B2 * | 12/2003 | Fourrey et al. | 297/452.52 X |
| 6,793,289 B2 * | 9/2004 | Kuster et al. | 297/452.52 |
| 7,585,030 B2 | 9/2009 | Galbreath et al. | |
| 8,308,235 B2 * | 11/2012 | Ellison et al. | 297/452.27 X |
| 2004/0084937 A1 | 5/2004 | Berta | |
| 2006/0103189 A1 | 5/2006 | Humer et al. | |
| 2009/0066142 A1 | 3/2009 | Ventura et al. | |
| 2010/0156163 A1 | 6/2010 | Daisuke et al. | |
| 2011/0018329 A1 * | 1/2011 | Galbreath et al. | 297/452.18 |
| 2011/0221254 A1 * | 9/2011 | Lindsay et al. | 297/452.18 |
| 2012/0049603 A1 * | 3/2012 | Ellison | 297/452.18 X |

\* cited by examiner

VEHICLE SEATING FRAME ATTACHMENT ASSEMBLY, AND METHOD OF MAKING THE SAME

CROSS-REFERENCE TO RELATED APPLICATIONS

This application claims the benefit of U.S. provisional Application No. 61/461,554 filed Jan. 20, 2011. The disclosure of which is incorporated in its entirety by reference herein.

TECHNICAL FIELD

In at least certain embodiments, the present invention relates to a vehicle seat frame attachment assembly for attaching a vehicle seat frame to a vehicle, a vehicle seat, and methods of making the same.

BACKGROUND

Most vehicles have a second, and in some case, a third row of seat assemblies. Generally speaking, most seat assemblies include three fundamental components: (a) a frame to support the seat assembly and mount it to a body, such as a vehicle floor pan; (b) a cushion, typically made of foam, to cover the frame; and (c) trim material to cover cushion and provide a durable surface for contact with a seat assembly occupant. Conventional vehicle seat assemblies typically involve the use of a metal frame and wires for securing the seating assembly to the vehicle. This adds relatively significant weight and complexity to the manufacturing process.

Recently vehicles have begun replacing metal seat frames with structural foam seat frames to take advantage of the relatively high strength to weight ratio of structural foams. These structural foam seat frames are typically attached to the vehicle, such as the seat pan, by spaced apart front and rear attachment wire tabs. The tabs are usually either molded into the frame during molding of the structural foam seat frame or secured to the frame after molding in a post molding operation. While structural foam seat frames can provide certain advantages over metal frames, in certain high stress situations, such as certain frontal impacts, structural foam frames can be more prone to failure than metal frames.

Accordingly, there is a desire to provide a vehicle structural foam vehicle seat frame having a relatively high structural integrity.

SUMMARY

According to at least one aspect of the present invention, a vehicle seat assembly is provided. In at least one embodiment, the seat assembly comprises a seat frame made of structural foam and having a main body portion having a forward portion and a rearward portion, and a wire attachment bracket having a front attachment tab, a rear attachment tab, and a connecting portion extending between the front and rear attachment tabs. In at least this embodiment, the front attachment tab is securable to a vehicle floor pan to secure the forward portion of the seat frame to the vehicle floor pan, and the rear attachment tab is securable to a vehicle floor pan to secure the rearward portion of the seat frame to the vehicle floor pan. In at least this embodiment, the seat assembly further comprises a cushion supported on the frame, the cushion being softer than the seat frame; and a trim material disposed over the cushion.

In at least one embodiment, the vehicle seat assembly further comprises a second wire attachment bracket spaced laterally from the first wire attachment bracket, the second wire attachment bracket having a front attachment tab, a rear attachment tab, and a connecting portion extending between the front and rear attachment tabs, the front attachment tab being securable to a vehicle floor pan to secure the forward portion of the seat frame to the vehicle floor pan, and the rear attachment tab being securable to a vehicle floor pan to secure the rearward portion of the seat frame to the vehicle floor pan.

In yet another embodiment, the frame has a groove to receive at least a portion of the connecting portion of the first wire attachment bracket.

In still yet another embodiment, the front attachment tabs are securable within mounting ports in a vehicle floor pan via a snap fit, and the rear attachment tabs are securable to a vehicle floor pan via bolts.

According to at least another aspect of the present invention, a vehicle seat frame component securable to a vehicle floor pan is provided. In at least one embodiment, the frame component comprises a seat frame made of structural foam and having a main body portion having a forward portion and a rearward portion, and a first wire attachment bracket having a front attachment tab, a rear attachment tab, and a connecting portion extending between the front and rear attachment tabs. In at least one embodiment, the front attachment tab is securable to a vehicle floor pan to secure the forward portion of the seat frame to the vehicle floor pan, and the rear attachment tab is securable to a vehicle floor pan to secure the rearward portion of the seat frame to the vehicle floor pan.

According to at least another aspect of the present invention, a method of making a vehicle seat assembly is provided. In at least one embodiment, the method comprises providing a seat frame made of structural foam and having a main body portion, a forward portion and a rearward portion, and securing an attachment bracket to the seat frame. In at least one embodiment, the attachment bracket has a front attachment tab, a rear attachment tab, and a connecting portion extending between the front and rear attachment tabs, with the front attachment tab being securable to a vehicle floor pan to secure the forward portion of the seat frame to the vehicle floor pan, and the rear attachment tab being securable to a vehicle floor pan to secure the rearward portion of the seat frame to the vehicle floor pan. In at least one embodiment, the method further comprises supporting a foam cushion on the frame, and disposing a trim material over the cushion and the frame.

In at least one embodiment, the seat bottom comprises a seat frame made of a structural foam and a cushion supported on the frame. In yet a further embodiment, the structural foam comprises expanded polyolefin.

DETAILED DESCRIPTION

As required, detailed embodiments of the present invention are disclosed herein. However, it is to be understood that the disclosed embodiments are merely exemplary of the invention that may be embodied in various and alternative forms. The figures are not necessarily to scale, some features may be exaggerated or minimized to show details of particular components. Therefore, specific structural and functional details disclosed herein are not to be interpreted as limiting, but merely as a representative basis for the claims and/or a representative basis for teaching one skilled in the art to variously employ the present invention.

Moreover, except where otherwise expressly indicated, all numerical quantities in the description and in the claims are to be understood as modified by the word "about" in describing the broader scope of this invention. Practice within the numerical limits stated is generally preferred. Also, unless expressly stated to the contrary, the description of a group or class of material as suitable or preferred for a given purpose in connection with the invention implies that mixtures of any two or more members of the group or class may be equally suitable or preferred.

Figure 1:
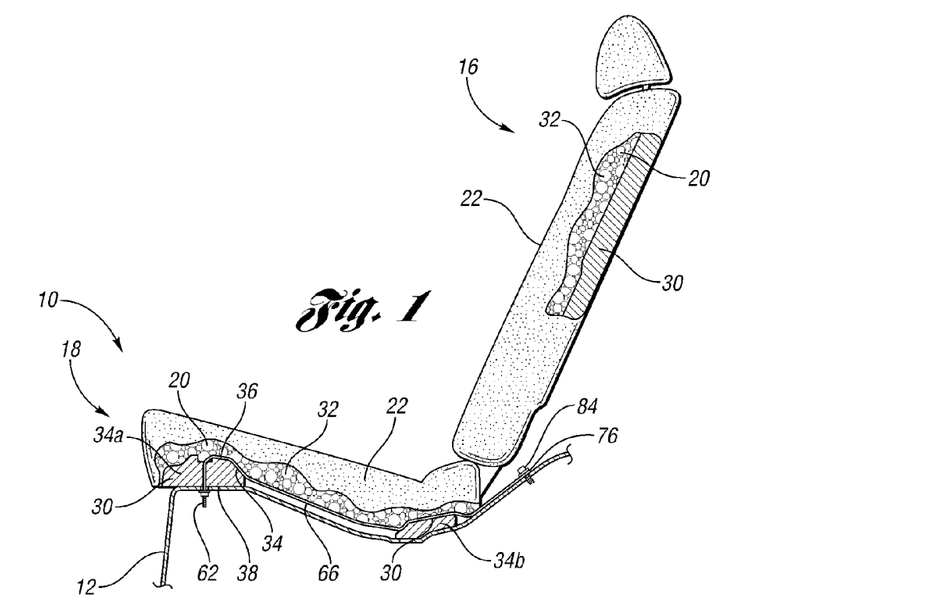
FIG. 1 is a schematic cross-sectional side view of a vehicle seat assembly employing the use of a frame attachment assembly in accordance with an embodiment of the present invention.

Referring now to the Figures, where like numerals are used to designate like structures throughout the drawings, a schematic vehicle seat assembly in accordance with at least one embodiment of the present invention is generally shown at 10 in FIG. 1. While the vehicle seat assembly 10 is illustrated in FIG. 1 to be a rear bucket seat assembly, it should be understood that the principles of the invention are applicable to other types of seat assemblies, such as bench, captain and other types of seat assemblies. Moreover, it should be understood that the principles of this invention are also applicable to other seat rows, such as the front and third rows of seats. It should also be understood that the principles of the present invention are applicable to other configurations where foam is a component such as backrests. Still further, it should also be understood that the principles of this invention are applicable to all types of vehicle seat assemblies as well as non-vehicle seat assemblies.

As shown in FIG. 1, the vehicle seat assembly 10 is supported on a vehicle floor pan 12. The vehicle seat assembly 10 may be secured in any suitable manner to the floor pan 12. In certain embodiments, the vehicle seat assembly 10 may be secured to parts of the vehicle other than, or in addition to, the floor pan, such as a vehicle body frame, riser or stanchion.

The illustrated vehicle seat assembly 10 includes a seat back, generally indicated at 16, and a lower seat assembly, generally indicated at 18. In at least the illustrated embodiment, the seat back 16 and the lower seat assembly 18 each have a cushion composite 20 covered by a trim material 22. As can best be seen in FIG. 1, in the illustrated embodiment, the cushion composite 20 includes a structural polymeric frame 30 and a cushion 32 that is disposed over the structural frame 30.

In the illustrated embodiment, the cushion composite 20 in both the seat back 16 and the lower seat assembly 18 are made of generally the same construction. However, it should be understood that the seat back 16 could have an entirely different construction than that of the lower seat assembly 18. For instance, the cushion composite 20 for the seat back 16 can differ from the cushion composite 20 of the lower seat assembly 18. Furthermore, the seat back 16 could have a more conventional seat frame, such as those that are stamped or welded out of suitable metals such as aluminum, steel or other metal alloys instead of one made of a structural polymeric material. Likewise, it should be understood that the trim material 22 for the seat back 16 can differ from the trim material 22 for the lower seat assembly 18.

The cushion composite 20 may optionally include a comfort pad (not shown) that is disposed over the cushion 32. As will be explained further below, in at least one embodiment, each of the frame member 30, the cushion 32 and, if present, the optional comfort pad, cooperate with, and in some embodiments are secured to, each other in a manner such that they are relatively easily separable for recycling at end of use. If any of the frame 30, the cushion 32, and optional comfort pad are secured to another, suitable securement methods can be used, such as the use of interference fits, surface tension resistance modifications, clips and/or adhesive, in such a manner as to allow for relatively easy separation of the components.

Figure 2:
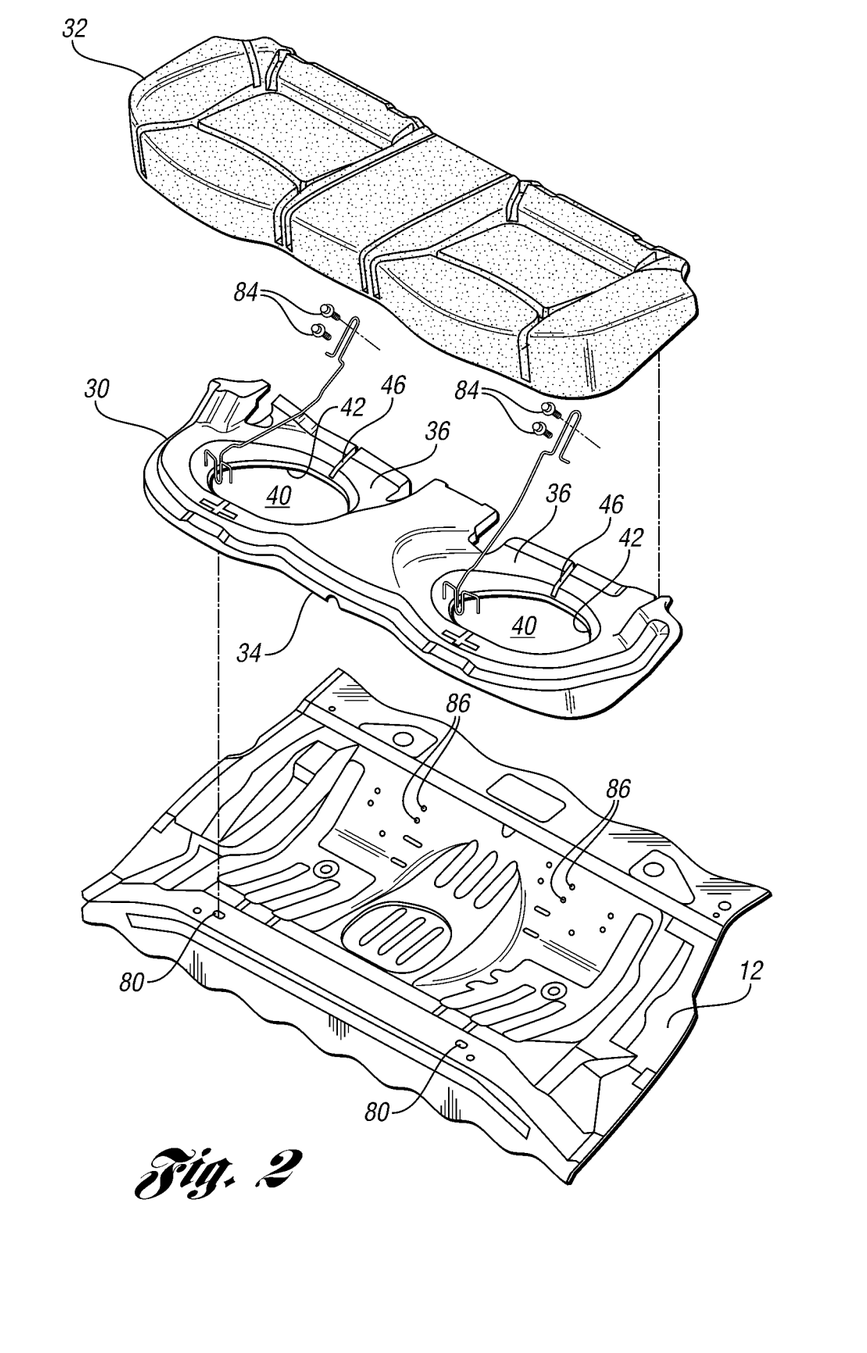
FIG. 2 is an exploded perspective view of the vehicle seat assembly illustrated in FIG. 1.
Figure 3:
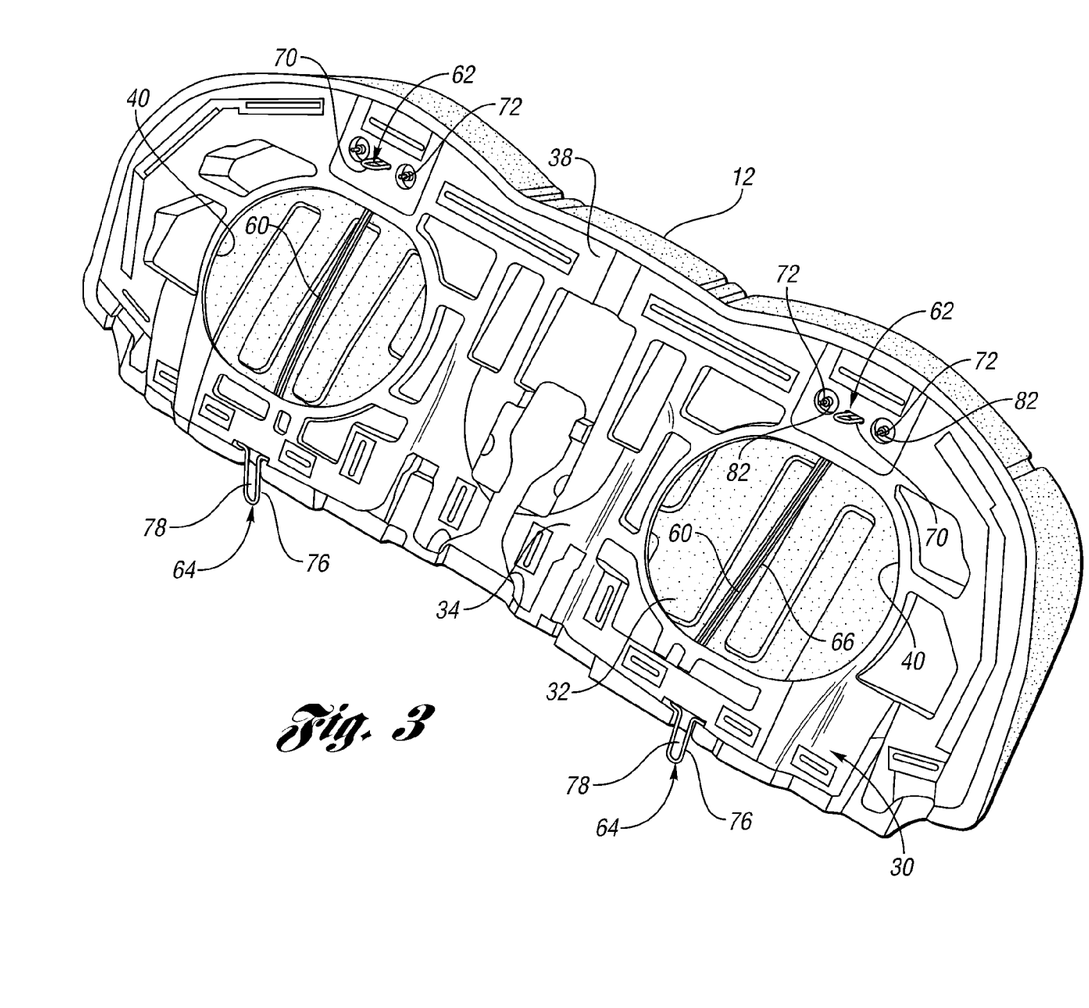
FIG. 3 is a rear perspective view of a components of the vehicle seat assembly illustrated in FIG. 1 in accordance with one embodiment.
Figure 4:
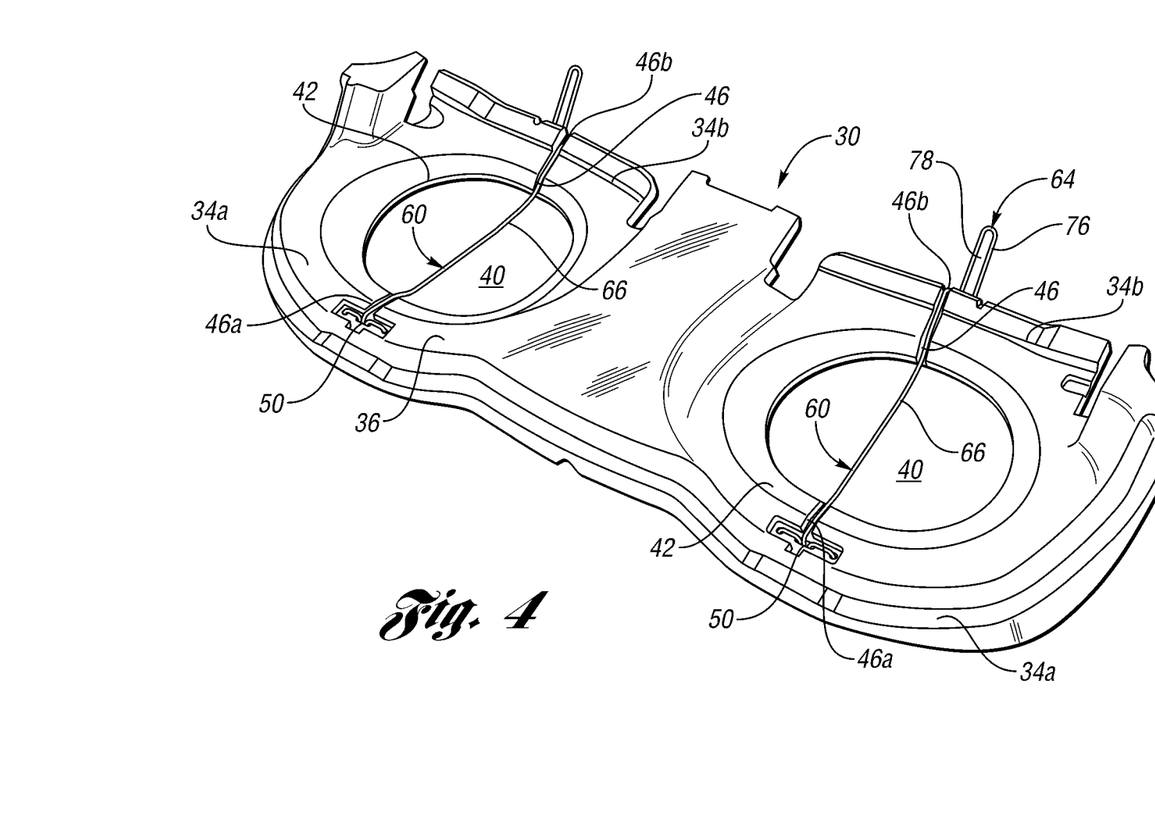
FIG. 4 is a perspective view of components of the vehicle seat assembly illustrated in FIG. 1 in accordance with one embodiment.

The frame 30 has a main body portion 34 having an upper surface 36 and a lower surface 38. In at least one embodiment, the main body portion 34 has an average thickness of 10 to 400 mm, a length of 400 to 1400 mm and a width of 300 to 600 mm. In at least one embodiment, the main body portion 34 has an average thickness of 20 to 60 mm, a length of 1200 to 1350 mm and a width of 400 to 500 mm. In at least the illustrated embodiment, as shown in FIGS. 2-4, the frame 30 includes two spaced recesses or openings 40 adjacent defined by surface 42. In at least certain of the illustrated embodiments, the openings 40 divide the main body portion 34 of the frame 30 into a front portion 34a and a rear portion 34b. In at least the certain of the illustrated embodiments, the surface 42 is a beveled surface extending between the upper surface 36 and the lower surface 38 of the main body portion 34 of the frame 30. In at least one embodiment, each of the openings 40 has a depth of 2 to 10 cm and a width of 10 to 30 cm. The openings 40 may be spaced any suitable distance but in at least one embodiment are spaced 20 to 50 cm from each other. However, it should be understood that the numbers, locations, sizes and shapes of the openings 40 can vary as desired.

The structural frame 30, in at least the illustrated embodiments, includes a pair of spaced apart grooves 46 extending essentially from back to front along the upper surface 36 of the main body portion 34 of the frame 30. The grooves 46 are any suitable depth and width, but in at least one embodiment each have a depth of 5 to 15 mm and a width of 5 to 15 mm, and in other embodiments a depth of 8 to 12 mm and a width of 8 to 12 mm.

As best shown in FIG. 4, each of the grooves 46 are shown to have a forward groove 46a spaced from a rearward groove 46b separated by the opening 40, however it should be understood that the frame 30 could be used without the openings in which case the grooves 46 would essentially run continuously over the upper surface 36 of the frame 30. In embodiments where the grooves 46 have forward and rearward grooves 46a and 46b, in at least one embodiment, each of the groove 46a and 46b can independently have lengths of 4 to 10 cm, and in other embodiments of 5 to 7.5 cm, however it should be understood that any suitable lengths could be employed. In embodiments where the grooves 46 essentially run continuously over the upper surface 36 of the frame 30, in at least one embodiment, each of the grooves 46 can independently have lengths of 25 to 70 cm, and in other embodiments of 40 to 50 cm, however it should be understood that any suitable lengths could be employed.

In at least one embodiment, each of the grooves 46 communicates with a tab opening 50 that extends from the upper surface 36 of the frame 30 to the lower surface 38 of the frame 30. In at least certain of the illustrated embodiments, the forward grooves 46a communicate with the tab openings 50. The tab openings 50 can be any suitable shape or size, but in at least one embodiment have a depth of 2 to 8 cm and a width of 60 to 120 mm, and in at least another embodiment have a depth of 3 to 5 cm and a width of 75 to 100 mm. It should be understood that the grooves 46, the recesses 40 and/or the tab openings 50 could be conventionally molded in the frame 30 or formed via one or more post molding operation steps.

The structural frame 30 can be made of any suitable structural foam material. In at least one embodiment, suitable structural materials will have a rigidity and/or hardness (i.e., compressive strength) that is higher than conventional polyurethane foam.

In at least one embodiment, the structural frame 30 comprises a molded expanded polyolefin (EPO) layer. Suitable examples of expanded polyolefin (EPO) include, but are not necessarily limited to, expanded polyethylene (EPE), expanded polypropylene (EPP), expanded polybutylene (EPB), and copolymers of ethylene, propylene, butylene, 1,3-butadiene, and other olefin monomers, such as alpha-olefin monomers having from 5-18 carbon atoms, and/or cycloalkylene monomers such as cyclohexane, cyclopentene, cyclohexadiene, norbornene, and aromatic substituted olefins, such as styrene, alpha-methylstyrene, paramethylstyrene, blends thereof and the like.

In at least one particular preferred embodiment, the EPO is expanded polypropylene (EPP) and its copolymers with ethylene, propylene and butylene. Any suitable EPP may be used, however in at least one embodiment, suitable EPPs include, but are not limited to, ARPRO® EPP available from JSP International and EPP available from Kaneka.

Expanded polyolefins can be prepared by an expanded bead forming process in which relatively small uniform beads of polymer are produced, containing a gas which is utilized to effect blowing during the forming process. The most commonly used gas is air although other gases including low boiling point liquids which produce gases at the molding temperatures may be used. Suitable gases include, but are not limited to air, nitrogen, carbon dioxide, pentene and the like.

The expanded polyolefin can be formed into the structural frame 30 via any suitable forming process, such as exposing to steam in a mold, e.g., "steam chest molding". In at least one embodiment, the beads used to form the structural frame 30 have an average bead size of 0.5 to 8.0 mm, and in other embodiments of 1.0 to 6.0 mm.

Attachment brackets 60 are provided for securing the frame 30 to the floor pan 12. The attachment brackets 60 can be made of any suitable material and can have any suitable shape. However, in at least certain illustrated embodiment, the attachment brackets 60 are made of wire, and will be referred to as such in a non-limiting manner herein. In at least the illustrated embodiments, two spaced apart wire attachments 60 are shown, however it should be understood that any suitable number, such as one or three, of wire attachments 60 could be used. In at least one embodiment, the wire attachment 60 comprises a front attachment tab 62, a rear attachment tab 64, and a connecting portion 66 extending between and connecting the front and rear attachment tabs. The connecting portion 66, or at least segments of the connecting portion as shown in certain of the illustrated embodiments, of the wire attachment 60 is received within the grooves 46, with the front attachment tab 62 extending through the tab opening 50 in the frame 30 and the rear attachment tab 64 extending adjacent the rear portion of the frame 30, however it should be understood that the wire attachment 60 could be placed over the frame 30 in any suitable manner and not necessarily as shown in the illustrated embodiments.

In at least certain of the illustrated embodiments, the front attachment tab 62 has a looped portion 70 and adjacent arms 72 extending downwardly from the front end of the connecting portion 66. In at least one embodiment, the looped portion 70 is 50 to 125 mm wide and 40 to 125 mm long. In at least another embodiment, the looped portion 70 is 70 to 90 mm wide and 60 to 80 mm long. However, it should be understood that the looped portion 70 can have any suitable dimensions. In at least certain of the illustrated embodiments, looped portion 70 of the front attachment tab 62 is disposed through the tab opening 50. However, in at least other embodiments, the front portion of the connecting portion 66 of the wire attachment can be disposed over the front surface of the frame 30, and thus the tab opening 50 would not be necessarily provided. The looped portion 70 is securable to the floor pan 12 in any suitable manner, and in at least the embodiment shown in certain of the figures is snap fittable into a mounting grommet 80 of the floor pan 12. The arms 72 are securable to the frame 30 in any suitable manner, and in at least the embodiment shown in certain of the figures via bolts 82.

Figure 5:
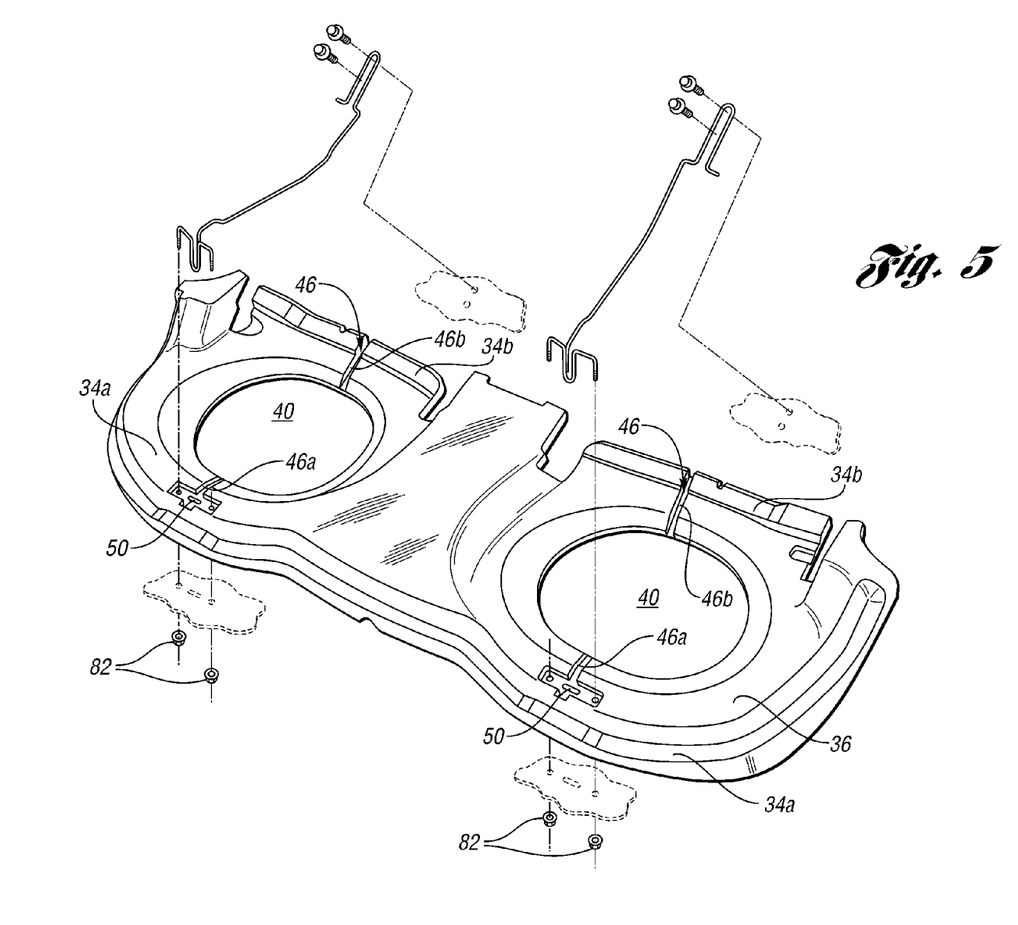
FIG. 5 is an exploded perspective view of the components illustrated in FIG. 4.
Figures 6, 7:
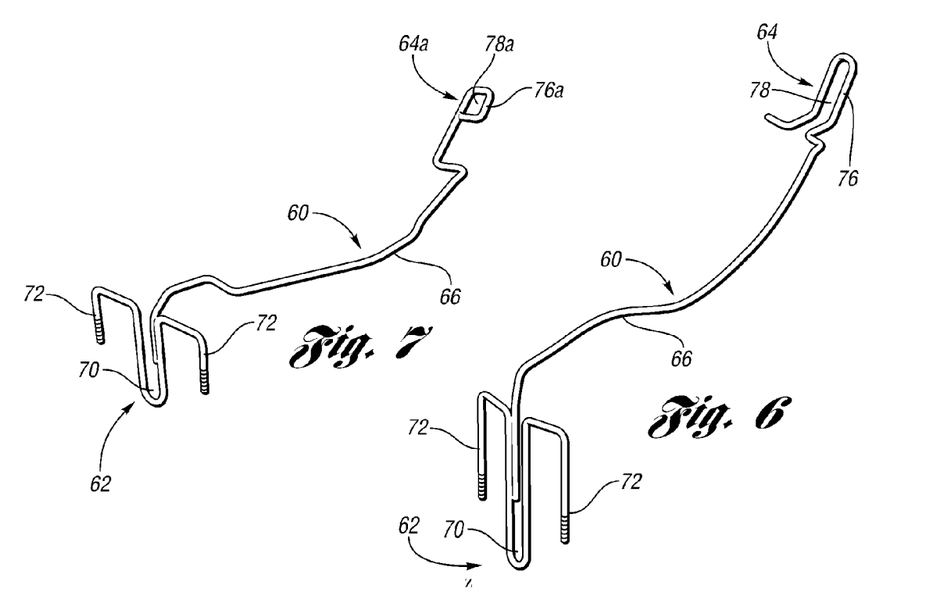
FIG. 6 is a perspective view of a component illustrated in FIG. 5 in accordance with one embodiment.
FIG. 7 is a view similar to FIG. 6 illustrating another embodiment.

In at least certain of the illustrated embodiments, as best seen in FIG. 6, the rear attachment tab 64 has an open, relatively elongated, looped opening 76 forming an open attachment opening 78. As can be envisioned, the open attachment potion 78 is slidable over an elongated bracket or other such attachment member. The shape of the opening 78 can assist in the retention of the opening shape when a securing member, such as a bolt or screw, is driven into the floor pan 12 via the opening, preventing the wire opening from spreading and allowing the attachment to come loose. In at least one embodiment, the looped portion 76 is 10 to 50 mm wide and 40 to 125 mm long. In at least another embodiment, the looped portion 76 is 20 to 30 mm wide and 70 to 85 mm long. However, it should be understood that the looped portion 76 can have any suitable dimensions. The looped portion 76, at least in certain illustrated embodiments, extends rearwardly from the rear end of the connecting portion 66. As best seen in FIGS. 2 and 5, the looped portion 76 is securable to the floor pan 12 in any suitable manner, and in at least the embodiment shown in certain of the figures is fastenable to the floor pan 12 via bolts 84 and mounting holes 86 in the floor pan 12.

In another embodiment, as shown in FIG. 7, the rear attachment tab 64a has a closed, relatively short looped portion 76a forming a closed attachment opening 78a. As can be envisioned, the closed attachment portion 76a is displaceable over a relatively square bracket. The closed loop 76a helps the attachment integrity when attached to the floor pan 12. In at least one embodiment, the looped portion 76a is 10 to 50 mm wide and 40 to 125 mm long. In at least another embodiment, the looped portion 76a is 20 to 30 mm wide and 70 to 85 mm long. However, it should be understood that the looped portion 76a can have any suitable dimensions. The looped portion 76a, at least in certain illustrated embodiments, extends rearwardly from the rear end of the connecting portion 66a. The looped portion 76a is securable to the floor pan 12 in any suitable manner, and in at least the embodiment shown in certain of the figures is fastenable to the floor pan 12 via bolts 84 and mounting holes 86 in the floor pan 12.

The wire attachment 60 can have any suitable dimension and be made of any suitable material. In at least one embodiment, the wire attachment 60 has a diameter of 2.5 to 8 mm and a length of 30 to 60 cm. In at least another the wire attachment 60 has a diameter of 4 to 6 mm and a length of 40 to 50 cm. In at least one embodiment, the wire attachment 60 is made of low carbon steel, such as 1008 and 1010 carbon steel, however, could be made of higher strength steel if the design results in relatively high loading conditions. In one embodiment, the carbon steel has a 1% maximum magnesium content. In at least one embodiment, suitable steel materials will have a tensile strength of 150 to 500 MPa, and in at least another embodiment of 350 to 425 MPa. In at least one embodiment, suitable steel materials will have a yield strength of 275 to 475 MPa, and in at least another embodiment of 300 to 400 MPa. In at least one embodiment, suitable steel materials will have a Rockwell B hardness (HB) of 75 to 120, and in at least another embodiment of 90 to 105. In at least one embodiment, suitable steel materials will have a percent elongation of 15% to 40%, and in at least another embodiment of 20% to 30%. Tensile strength can be measured by ASTM test method No. A370, yield strength can be measured by ASTM test method No. A370, Rockwell B hardness can be measured by ASTM test method No. A370, and percent elongation can be measured by ASTM test method No. A370.

In at least certain embodiments illustrated in the figures, the front attachment tab 62 secures the front portion 34a of the frame 30 to the floor pan 12, the rear attachment tab 64 secures the rear portion 34b of the frame 30 to the floor pan 12, and a substantial portion of the connection portion 66 of the wire attachment 60 is disposed within the opening 40 adjacent the cushion 32 and the floor pan 12. This arrangement is particularly well suited for maintaining both the front and rear portions 34a and 34b relatively stationary in high stress situations.

The cushion 32 can comprise any suitable cushion material, such as a suitable resilient polymer. In at least certain embodiments, the cushion material comprises conventional polyurethane foam, soy-based foam, silicone, thermoplastic olefins, thermoplastic urethanes, and/or natural oil-based expanded polyurethanes and the like. In other embodiments, the cushion material could be non-woven material, such as polyester, nylon or natural fibers. In at least one embodiment, because of its environmentally friendly nature, soy-based polyurethane is preferred. Any suitable soy-based polyurethane may be used, however in at least one embodiment, suitable soy-based polyurethanes include, but are not necessarily limited to those available from Lear and Renosol. The cushion 32 can be any suitable size and shape, however, in at least one embodiment, the cushion 32 has an average thickness of 20 to 100 mm, and in at least another embodiment of 30 to 70 mm, and in still yet other embodiments of 40 to 60 mm.

If a comfort pad is provided, it can comprise any suitable comfort layer or pad and can be made of any suitable material that provides good hand feel and soft resilience as the seat assembly 10 is deflected during use. It should be understood that the structural frame 30, the cushion 32, and, if present, the comfort pad can have any suitable configuration, shape and size.

As discussed above, the vehicle seat assembly 10 also includes trim material 22 which is adapted to engage the cushion composite 20 in a covering relationship. The trim material 22 may include any material known in the art. By way of example, some of the known materials include cloth, leather or polymers of sufficient quality and thickness for use in seat trim applications. Polymer trim materials may include a flexible close cell polymer skin material such as polyvinyl, polyvinyl chloride (PVC), polyester, nylon, thermoplastic olefin (TPO) or thermoplastic urethane (TPU). Additional materials for use as trim material 22, may include a foam backing (not shown, but generally known in the art) which may be manufactured from a variety of polymer foam materials. By way of example, the foam backing may be polyethylene, polypropylene, polyurethane, or a polystyrene foam. Optionally, a mesh or reinforcing material (not shown, but generally known in the art) such as fiberglass, nylon, polyester or natural fibers may be applied to the foam backing or back of the trim material 22 for increase in strength without increasing rigidity.

In at least certain embodiments, the frame 30, the cushion 32, if present, the comfort pad, and the trim material 22 are configured so that they can be easily assembled and disassembled to facilitate assembly and end of line disassembly for recycling. In at least one embodiment, the frame 30 and the cushion 32 are not secured to each other by any suitable mechanical fastening. In this embodiment, the cushion 32 is placed over the frame 30 and both are held together by the overlying trim material 22. In other embodiments, the frame 30 and cushion 32 can have mechanical fastening components, such as adhesive and/or clips, to hold onto each other.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A vehicle seat assembly comprising:
a seat frame made of structural foam, the seat frame having a main body portion having a forward portion, a rearward portion, an upper surface and a bottom surface, the upper surface having a first groove portion on the forward portion and a second groove portion, spaced from the first groove portion, on the rearward portion;
a first wire attachment bracket having a front attachment tab, a rear attachment tab, and a connecting portion extending between the front and rear attachment tabs, the connecting portion of the attachment bracket being received within the first and second groove portions, the front attachment tab being securable to a vehicle floor pan to secure the forward portion of the seat frame to the vehicle floor pan, and the rear attachment tab being securable to a vehicle floor pan to secure the rearward portion of the seat frame to the vehicle floor pan;
a cushion supported on the seat frame, the cushion being softer than the seat frame; and
a trim material disposed over the cushion.

2. The vehicle seat assembly of claim 1 further comprising a second wire attachment bracket spaced laterally from the first wire attachment bracket, the second wire attachment bracket having a front attachment tab, a rear attachment tab, and a connecting portion extending between the front and rear attachment tabs, the front attachment tab being securable to a vehicle floor pan to secure the forward portion of the seat frame to the vehicle floor pan, and the rear attachment tab being securable to a vehicle floor pan to secure the rearward portion of the seat frame to the vehicle floor pan.

3. The vehicle seat assembly of claim 2 wherein the front attachment tabs are securable within mounting ports in a vehicle floor pan via a snap fit, and each of the rear attachment tabs comprising a closed-loop portion securable to a vehicle floor pan via bolts.

4. The vehicle seat assembly of claim 3 wherein the seat frame has a third groove portion, spaced laterally from the first and second groove portions, to receive at least a portion of the connecting portion of the second wire attachment bracket.

5. The vehicle seat assembly of claim 3 wherein the forward portion of the seat frame has apertures to receive the front attachment tabs and the rear attachment tabs each comprise a closed loop opening.

6. The vehicle seat assembly of claim 1 wherein the structural foam is made of expanded polyolefin.

7. The vehicle seat assembly of claim 6 wherein the structural foam is made of EPP and the cushion is made of polyurethane foam.

8. The vehicle seat assembly of claim 1 wherein the main body portion of the seat frame has at least one recess disposed between the forward portion and the rearward portion of the main body portion of the seat frame, the recess extending between the upper surface and the bottom surface of the main body portion, the cushion extending from a forward portion to a rearward portion, the forward portion of the cushion being supported on the forward portion of the seat frame to the rearward portion of the cushion being supported on the rearward portion of the seat frame.

9. A vehicle seat frame component securable to a vehicle floor pan, the seat frame component comprising:
   a seat frame made of structural foam, the seat fame having a main body portion having a forward portion, and a rearward portion, an upper surface and a bottom surface, the upper surface having a first groove portion on the forward portion and a second groove portion, spaced from the first groove portion, on the rearward portion, the main body portion of the seat frame having an opening disposed between the forward portion and the rearward portion of the main body portion of the seat frame, the opening extending between an upper surface and the bottom surface of the main body portion, the opening having a width of 10 to 30 cm; and
   a first wire attachment bracket having a front attachment tab, a rear attachment tab, and a connecting portion extending between the front and rear attachment tabs, the connecting portion of the attachment bracket being received within the first and second groove portions, the front attachment tab being securable to a vehicle floor pan to secure the forward portion of the seat frame to the vehicle floor pan, and the rear attachment tab being securable to a vehicle floor pan to secure the rearward portion of the seat frame to the vehicle floor pan.

10. The vehicle seat frame component of claim 9 further comprising a second wire attachment bracket spaced laterally from the first wire attachment bracket, the second wire attachment bracket having a front attachment tab, a rear attachment tab, and a connecting portion extending between the front and rear attachment tabs, the front attachment tab being securable to a vehicle floor pan to secure the forward portion of the seat frame to the vehicle floor pan, and the rear attachment tab being securable to a vehicle floor pan to secure the rearward portion of the seat frame to the vehicle floor pan, the seat frame being supportable on the vehicle floor pan.

11. The vehicle seat flame component of claim 10 wherein the front attachment tabs are detachably securable within mounting ports in a vehicle floor pan, and the rear attachment tabs are detachably securable to a vehicle floor pan.

12. The vehicle seat flame component of claim 10 wherein the seat flame has a third groove portion to receive at least a portion of the connecting portion of the second wire attachment bracket, the third groove portion being spaced laterally from the first and second groove portions, and the opening being disposed between the first and second groove portions and the third groove portion.

13. The vehicle seat frame component of claim 9 wherein the forward portion of the seat frame has an aperture to receive the front attachment tab.

14. The vehicle seat frame component of claim 9 wherein the structural foam is made of expanded polyolefin and the first wire attachment bracket has a yield strength of 275 to 475 MPa.

15. A method of making a vehicle seat assembly, said method comprising:
   providing a seat frame made of structural foam and having a main body portion, a forward portion, a rearward portion, an upper surface and a bottom surface, the upper surface having a first groove portion on the forward portion and a second groove portion, spaced from the first groove portion, on the rearward portion;
   securing an attachment bracket to the seat frame, the attachment bracket having a front attachment tab, a rear attachment tab, and a connecting portion extending between the front and rear attachment tabs, the connecting portion of the attachment bracket being received within the first and second groove portions, the front attachment tab being securable to a vehicle floor pan to secure the forward portion of the seat frame to the vehicle floor pan, and the rear attachment tab being securable to a vehicle floor pan to secure the rearward portion of the seat frame to the vehicle floor pan;
   supporting a foam cushion on the seat frame; and disposing a trim material over the cushion and the seat frame.

16. The method of claim 15 further comprising providing an vehicle floor pan and securing the attachment tabs of the attachment bracket to the floor pan.

17. The method of claim 16 wherein the attachment tabs are secured to the floor pan via an interference fit.

18. The method of claim 15 wherein the main body portion of the seat frame has at least one recess disposed between the forward portion and the rearward portion of the main body portion of the seat frame, the recess extending between the upper surface and the bottom surface of the main body portion.

19. The method of claim 18 wherein the groove has a first portion disposed on the forward portion of the main body portion in front of the recess and a second portion disposed on the rearward portion of the main body portion behind the recess.

20. The vehicle seat assembly of claim 1 wherein the recess is 10 to 30 cm wide.

* * * * *